US006954420B1

(12) United States Patent
Wolf et al.

(10) Patent No.: US 6,954,420 B1
(45) Date of Patent: Oct. 11, 2005

(54) METHOD FOR DISPLAYING THE MODULATION ERROR OF A MULTIPLE CARRIER SIGNAL

(75) Inventors: Peter Wolf, München (DE); Christoph Balz, München (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 09/762,210

(22) PCT Filed: Sep. 23, 1999

(86) PCT No.: PCT/EP99/07101

§ 371 (c)(1),
(2), (4) Date: Mar. 2, 2001

(87) PCT Pub. No.: WO00/25471

PCT Pub. Date: May 4, 2000

(30) Foreign Application Priority Data

Oct. 26, 1998 (DE) .............................. 198 49 319

(51) Int. Cl.⁷ ........................................... H04J 15/00
(52) U.S. Cl. ...................... 370/203; 370/210; 375/224
(58) Field of Search ..................... 370/208, 23, 210; 329/307; 375/223–228; 455/226.1, 226.4, 455/44

(56) References Cited

U.S. PATENT DOCUMENTS

| 5,153,527 A | 10/1992 | Yaguchi |
| 5,799,038 A | 8/1998 | Nowara et al. |
| 5,963,589 A * | 10/1999 | Nagano et al. ............. 375/224 |

FOREIGN PATENT DOCUMENTS

DE   A1-19515037   10/1995

(Continued)

OTHER PUBLICATIONS

English Translation of French Patent Application No.: 2,742 613. pp. 1-22.*

(Continued)

*Primary Examiner*—Phirin Sam
*Assistant Examiner*—Robert W. Wilson
(74) *Attorney, Agent, or Firm*—Birch, Stewart, Kolasch & Birch, LLP

(57) ABSTRACT

The invention relates to a method for displaying the mean modulation error $MER_{RMS}$ of a multiple carrier (OFDM) signal in which: a) The square of the error vector is calculated according to the relation (I) for each actual modulation symbol I of each individual carrier k of the multiple carrier signal; b) this value $m_k$ is offset with the content of a storage location of a memory, said storage location being assigned to the same carrier k, which comprises the same number of storage locations as the OFDM signal carrier, according to relation (II) (iteration formula) with $A2_{k,1+1}$: new measured value (instant 1+1) which should be filed in storage location k of the memory A2; $A2_{k,l+l}$: previous measured value (instant 1) from storage location k of memory A2; $m_k$: Actual measured error square for carrier k; k: Carrier number within the OFDM spectrum, grows with the frequency, k=0 ... $K_{max}$; 1: number of the symbol, grows with time, $0 \leq 1$; c) the mean modulation error $MER_{RMS}$ is subsequently calculated for each carrier from these values of the storage locations according to relation (III), whereby $\overline{VM}$ is the quadratically weighted mean value of the amplitude of all ideal signal states of the modulation type, used each time, of a carrier modulated with useful data, and finally, d) this $MER_{RMS}$ value is then graphically represented with the number of the carriers as an abscissa for each individual carrier k as an ordinate value of a diagram.

4 Claims, 2 Drawing Sheets

FOREIGN PATENT DOCUMENTS

| | | |
|---|---|---|
| DE | A1-19713441 | 10/1997 |
| FR | A1-2742613 | 6/1997 |
| FR | 2742613 * | 6/1998 |

OTHER PUBLICATIONS

HP Press Release Online, 2 pages (1998).

* cited by examiner

METHOD FOR DISPLAYING THE MODULATION ERROR OF A MULTIPLE CARRIER SIGNAL

This application is the national phase under 35 U.S.C. § 371 of PCT International Application No. PCT/EP99/07101, which has an International filing date of Sep. 23, 1999, which designated the United States of America.

BACKGROUND OF THE INVENTION

1. Field of the Invention

The present invention relates to a process for displaying the mean modulation error ratio $MER_{Rms}$ of an orthogonal frequency division and multiplexing (OFDM) multicarrier signal.

2. Description of the Background Art

The modulation error ratio (MER) is an important characteristic value for the OFDM (Orthogonal Frequency Division and Multiplexing)—Multicarrier Systems used in modern transmission technology, for example in DAB (Digital Audio Broadcasting) or DVB-T (Digital Video Broadcasting-Terrestrial), as it indicates the mean and maximum deviation of the amplitude and phase statuses (I and Q values) used in this case from the ideal signal statuses of the digital modulation used and therefore provides a measure for the signal quality. The modulation error ratio is given as a mean value and as a maximum value. In order to calculate it all decision fields of the modulation vector diagram are examined in succession. In order to determine the maximum value, the maximum sum of the differential vector from the ideal signal status to the signal statuses, which have been produced (error vector), is sought in each decision field. In addition to the maximum value of the intermediate results, the maximum value of the modulation error ratio $MER_{MAX}$ is then calculated in accordance with the equation $$MER_{MAX} = \cdot 100 \frac{\text{Max\{|error vector|\}}}{\overline{VM}} \quad (\%)$$

In this case $\overline{VM}$ is the square weighted mean value of the amplitude of all ideal signal statuses of a carrier modulated with user data of the modulation type used in each case, which value is known or can be easily calculated for the modulation types used most frequently, such as 16 QAM, etc., and is used constant in the calculation.

All sums of the differential vectors from the ideal status to the status which has been produced are square and added to obtain the mean modulation error ratio and the number of symbols is counted. Subsequently, the mean modulation error ratio $MER_{RMS}$ is calculated in accordance with the equation $$MER_{RMS} = 100 \cdot \frac{\sqrt{\frac{1}{n} \sum_n |\text{error vector}|^2}}{\overline{VM}} \quad (\%)$$

Both of the values calculated in percent in accordance with the above equations can also be given in the logarithmic scale in dB in accordance with the following conversion:

$$MER_{dB} = -20 \cdot 1 \text{ g} \left(\frac{MER(\%)}{100}\right) \text{ (dB)}.$$

The term modulation error ratio and the corresponding laws of calculation for it have been established and standardized by the DVB Measurement Group in the ETR 290 for DVB-C and DVB-S. FIG. 1 shows by way of example the vectors required to calculate the modulation error ratio in the first quadrants and this is for 64 QAM.

It is known to calculate the modulation error ratio for a single carrier in each case in accordance with the above formula and to display it as a numerical value. For multi-carrier systems with 1000 or even more individual carriers, as is the case in DAB with 1536 carriers and in DVB with 1705 or 6817 carriers even, this type of modulation error ratio calculation and individual carriers illustration is no longer useful.

SUMMARY OF THE INVENTION

It is therefore an object of the present invention to provide a process with which the modulation error ratio can be easily calculated with the lowest possible degree of calculation complexity and, in addition, can be illustrated in such a way that a simple and clear metrological evaluation is possible for all carriers.

This object is achieved for displaying the mean modulation error ratio for displaying the maximum modulation error ratio. These two possibilities preferably being used in combination, so a user is simultaneously shown the mean and maximum modulation error ratios as a function of the frequency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In accordance with the invention, a mean or maximum modulation error ratio is calculated by simple successive calculation stages, the result corresponds in this case to the equations mentioned above. The successive calculation stages demonstrated in accordance with the present invention solve this calculation in a shorter calculation time and in a manner which requires less memory space and can be executed for example on any conventional PC. Owing to the storage of the individual calculated values in memory locations of a memory having as many cells as carriers, the result of the modulation error ratio determination is directly related to the individual carriers and can, therefore, be directly illustrated on a graph as a function of the frequency for the entire multicarrier frequency band. Therefore, a user can immediately determine at which points of the spectrum critical conditions are present, and therefore a multicarrier system can also be analysed in a simple manner metrologically with regard to modulation error ratios for the first time.

Figure 1:
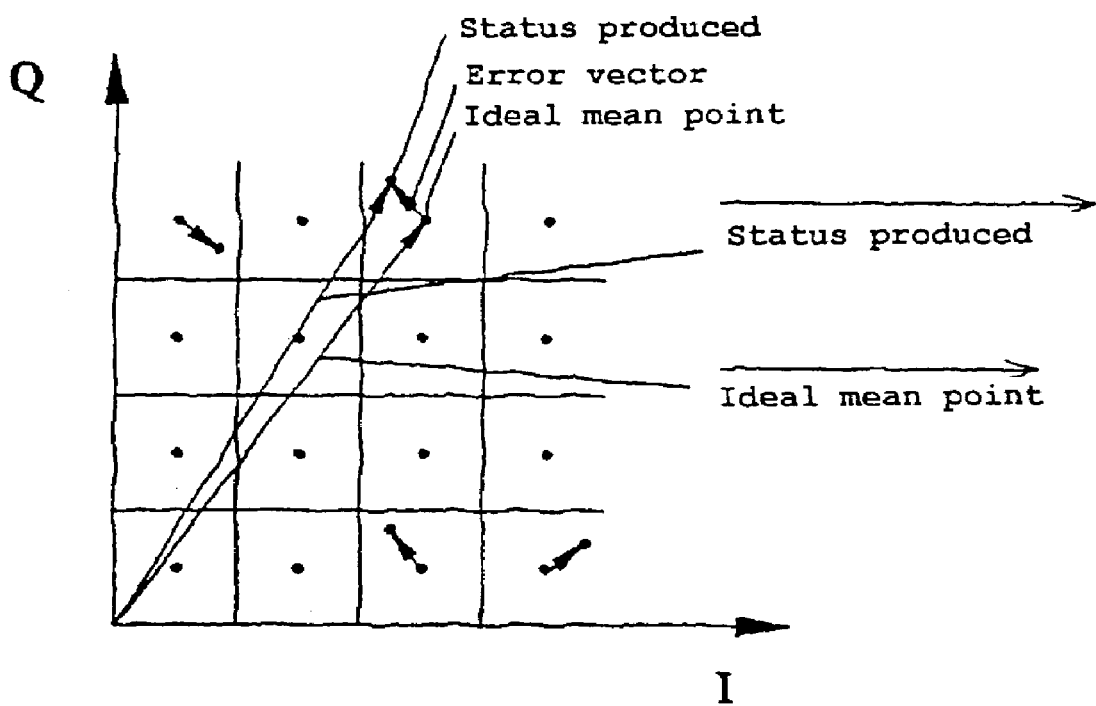
FIG. 1 illustrates the vectors required to calculate a modulation error ratio in a first quadrant, according to the conventional art.

The modulation error ratio of an individual carrier is subject to large statistically induced fluctuations. It is therefore necessary that, in accordance with the invention, integration is initially carried out via a plurality of symbols of data modulated on the individual carriers. A prerequisite for the process according to the invention is knowledge of the signal constellation of each individual carrier, as is illustrated schematically for 64 QAM in FIG. 1 for a quadrant in the I/Q plane. Initially the square of the error vector of the current individual carrier k is calculated for each current symbol in accordance with the equation:

$$m_k = |\text{error vector}_k|^2$$

As only a single point of the signal constellation is evaluated here for each carrier, the summation in accordance with the general equation mentioned at the start is omitted.

The result $m_k$ for each individual carrier k is then compared separately in a second calculation stage with the contents of a memory location reserved specifically for this individual carrier, which memory location is in turn associated with a memory A1. In this case, this memory A1 has as many memory locations $K_{MAX}+1$ as there are carriers in the OFDM system. A check is made in the memory location of the memory A1 associated with the current carrier k as to whether the current measured value $m_k$ is greater than the value already stored in this memory location. If the stored value is greater than the current value the memory location contents remain unchanged. If the current value is greater this is input as a new value into the memory location. In this way the maximum value is stored for each carrier.

At the same time the result of the $m_k$ of the current modulation error ratio is set off separately for each individual carrier against the contents of a separate memory location of the second memory A2, which also has as many memory locations as there are carriers in the OFDM system. Here, the value $A2_k$ hitherto present in the memory location k is set off against the current measured value $m_k$ in accordance with the following equation:

$$A2_{k,l-1} = \frac{(A2_{k,l} \cdot l + m_k)}{(l+1)} \quad \text{(iteration formula)}$$

where $A2_{k,l+1}$ is the new measured value (instant l+1) which is to be stored in memory location k of the memory A2, $A2_{k,l}$ is the previous measured value (instant l) from memory location k of the memory A2, $m_k$ is the current measured error square for carrier k, k is the carrier number within the OFDM spectrum, increases with the frequency, $k=0 \ldots K_{max}$, l is the number of the symbol, increases with time, $0 \leq l$.

This calculation stage is repeated for all carriers of the symbol. Then, the same process is carried out again for the next symbol for all carriers. Thus a representative picture of the mean modulation error ratio is produced over the course of many symbols in the memory A2 as a function of the frequency or the respective carrier number k. These calculation stages provide exactly the same result as the standardized equation mentioned at the start.

Alternatively the third calculation stage can also be divided in the following manner. Initially an intermediate value is calculated in accordance with the following equation:

$$A2'_{k,l+1} = A2'_{k,l} + m_k \quad \text{(iteration formula)}$$

where $A2'_{k,l+1}$ is the new measured value (instant l+1) which is to be stored in memory location k of the memory A2, $A2'_{k,l}$ is the previous measured value (instant l) from memory location k of the memory A2, $m_k$ is the current measured error square for carrier k, k is the carrier number within the OFDM spectrum, increases with the frequency, $k=0 \ldots K_{max}$.

l is the number of the symbol, which increases with time, $0 \leq l$.

If the memory A2' is now to be used to illustrate the mean modulation error ratio on the screen, the contents of each individual memory location must be divided by the number of symbols l+1 detected up to that point, which number is determined in a separate counter. Then, the final value A2 can again be calculated in accordance with the equation $$A2_{k,l} = \frac{A2'_{k,l}}{l+1}$$

This division allows a faster program sequence within a digital signal processor.

The actual mean or maximum modulation error ratio can then be calculated from the values of A1 and A2 calculated in this way in a subsequent calculation stage in accordance with the following equation from the values $\overline{VM}$ known for the type of modulation used in each case:

$$MER_{MAX,k} = 100 \cdot \frac{\sqrt{A1_k}}{\overline{VM}} \, (\%)$$

$$MER_{RMS,k} = 100 \cdot \frac{\sqrt{A2_k}}{\overline{VM}} \, (\%)$$

If a display in dB is desired the percentage value can be converted in accordance with the following equation:

$$MER_{dB} = -20.1 \, g\left(\frac{MER(\%)}{100}\right) \, (dB).$$

As a result, a minimum value in dB is derived from the maximum value in percent.

Figure 2:
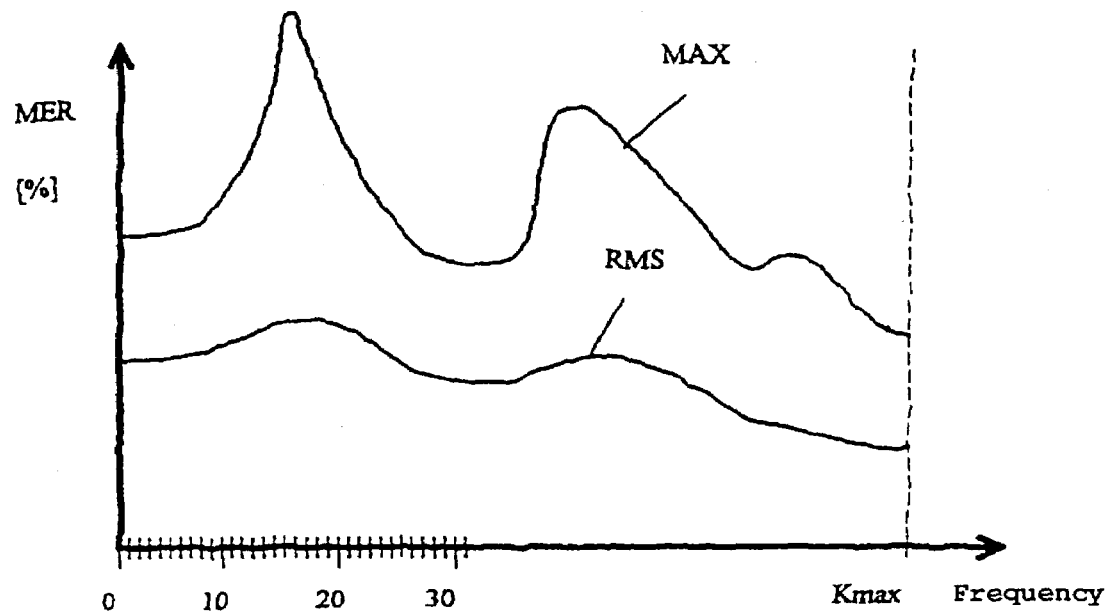
FIG. 2 illustrates a maximum and mean modulation error ratio in a graph on the screen of a display device, according to a preferred embodiment of the present invention.
Figure 2:
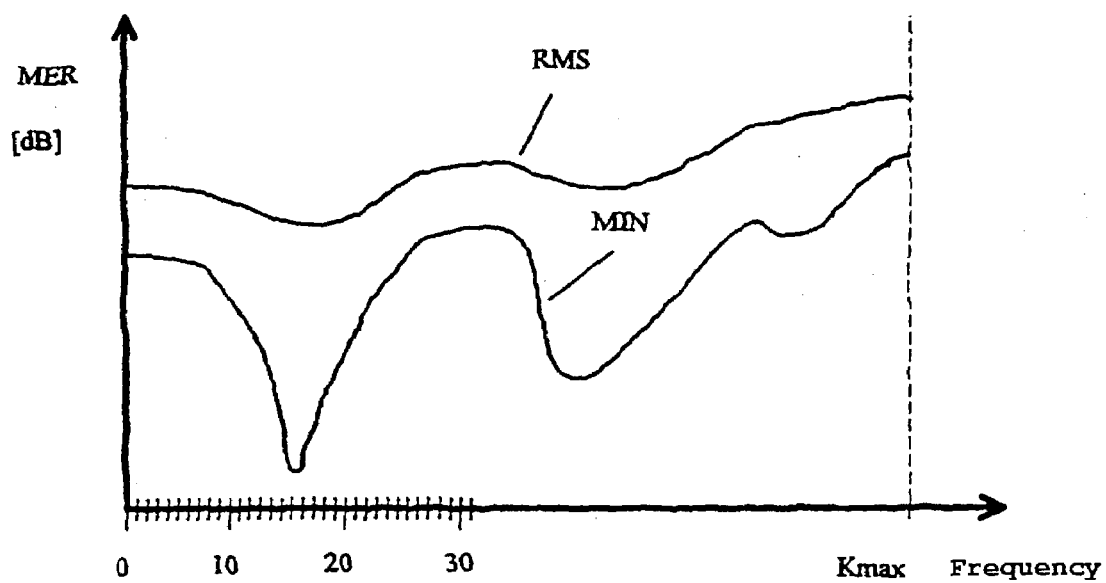

FIG. 2 shows the illustration of the maximum and mean modulation error ratio in a graph on the screen of a display device. The abscissa is scaled with the numbers of the individual carriers of the OFDM spectrum, between 0 and 6816 for example. The modulation error ratio calculated for each carrier in each case is plotted on the ordinate. The total of 1705 or 6817 carriers present per se in DVB-T could potentially lead to display resolution problems. Since a conventional LCD has a total of only 320 pixel columns for example, it is advantageous to divide the entire spectrum to be displayed as a whole into individual regions comprising only 320 carriers, for example, and to illustrate these in succession or to combine a plurality of carriers simultaneously in one column of the display.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for displaying a mean modulation error ratio $MER_{Rms}$ of an orthogonal frequency division and multiplexing (OFDM) multicarrier signal, the method comprising the steps of:

a) calculating, for each current modulation symbol I of each individual carrier k of the multicarrier signal, the square $m_k$ of the error vector according to:

$$m_k = |\text{error vector}_k|^2$$

b) setting off $M_k$ against contents of a memory location of a first memory that is associated with the same carrier k, the first memory having as many memory locations as the OFDM signal has carriers, according to:

$$A2_{k,l+1} = \frac{(A2_{k,l} \cdot l + m_k)}{(l+1)}$$

wherein $A2_{k,l+1}$ is a new measured value (instant l+1) that is to be stored in memory location k of the first memory A2, $A2_{2,l}$ is a previous measured value (instant l) from memory location k of the first memory, $m_k$ is a current measured error square for carrier k, k is a carrier number within the OFDM spectrum, which increases with the frequency, k=0 . . . $K_{max}$, and l is the number of the symbol, which increases with time, $0 \leq l$, c) calculating a mean modulation error $MER_{RmS}$ for each carrier from the values of the first memory locations according to:

$$MER_{RMS,k} = 100 \cdot \frac{\sqrt{A2_k}}{\overline{VM}} \; (\%)$$

where $\overline{VM}$ is a square weighted mean value of the amplitudes of all ideal signal statuses of a type of modulation used in each case of a carrier modulated with user data, and d) displaying on a display device the $MER_{RmS}$ value as a graph for each individual carrier k as an ordinate value in a graph with the number of carriers as abscissa.

2. The method according to claim 1, wherein for displaying the maximum modulation error ratio $MER_{MAX}$, the value $M_k$ calculated in accordance with the calculation step a) is compared with the value of a memory location of a second memory that is associated with the same carrier k, the second memory having as many memory locations as the OFDM signal has carriers, the value stored in this memory location being replaced by the current value when the current value is greater than that already stored, the method further comprising the step of:

e) calculating a maximum modulation error ratio $MER_{MAX}$ for each carrier from maximum values of the memory locations in accordance according to:

$$MER_{MAX,k} = 100 \cdot \frac{\sqrt{AI_k}}{\overline{VM}} \; (\%)$$

wherein $\overline{VM}$ is a square weighted mean value of an amplitude of all ideal signal statuses of the modulation type used in each case of a carried modulated with user data, and f) displaying on the display device the MER-max value on a graph for each individual carrier k as an ordinate value in a graph with the number of carriers as abscissa.

3. The method according to claim 1, wherein, in step b), an intermediate value is initially calculated in accordance with the equation:

$$A2'_{k,l+1} = A2'_{k,l} + m_k$$

where $A2'_{k,l+1}$ is a new measured value (instant l+1), which is to be stored in memory location k of the first memory, $A2'_{k,l}$ is a previous measured value (instant l) from memory location k of the first memory, $m_k$ is a current measured error square for carrier k, k is the carrier number within the OFDM spectrum, which increases with the frequency, k=0 . . . $K_{max}$, l is the number of the symbol, which increases with time, $0 \leq l$, wherein the intermediate value is divided prior to being displayed by the number of symbols detected which have been counted in a separate counter according to:

$$A2_{k,l} = \frac{A2'_{k,l}}{l+1}.$$

4. The method according to claim 1, wherein the values initially determined in percent for $MER_{RMS}$ or $MER_{MAX}$ are converted prior to their frequency-dependent graphic illustration into dB according to:

$$MER_{db} = -20.1 \; g\left(\frac{MER(\%)}{100}\right) \; (dB).$$

* * * * *